United States Patent Office 3,498,991
Patented Mar. 3, 1970

3,498,991
CERTAIN QUATERNARY AMMONIUM AND PYR-IDINIUM SALICYLATES, ACETYLSALICYLATES, PARA-AMINOSALICYLATES AND UNDECYLENATES
Alfred Halpern, Great Neck, Mortimer D. Sackler, New York, and Raymond R. Sackler, Roslyn, N.Y., assignors to Synergistics, Inc., Yonkers, N.Y., a corporation of New York
No Drawing. Filed Mar. 15, 1966, Ser. No. 534,412
Int. Cl. C07d 31/34, 29/24
U.S. Cl. 260—295                                     8 Claims

ABSTRACT OF THE DISCLOSURE

Quaternary nitrogen compounds having germicidal properties in which the acid moiety is selected from the group consisting of salicylic acid, acetylsalicylic acid, para-amino salicylic acid and undecylenic acid.

---

This invention relates to new and novel quaternary nitrogen derivatives of salicylic acid, acetylsalicylic acid, para-aminosalicylic acid and undecylenic acid which are useful for therapeutic purposes, the processes for preparing the same and methods for their use in achieving an analgesic, anti-inflammatory and antiseptic action. In particular, it relates to certain quaternary ammonium, piperidinium and pyridinium salts of salicylic acid, acetylsalicylic acid, para-amniosalicylic acid and undecylenic acid.

Salicylates are widely used in clinical medicine and have desirable pharmacologic properties as analgesics, antipyretics and anti-inflammatory agents. The salicylate ion, however, has certain inherent limitations which restrict its use. Thus, the salicylate ion has been shown to cause irritation to the gastrointestinal tract, as well as to be a keratolytic agent when applied to the skin.

The pharmaceutical emphasis in developing new salicylate compounds for therapeutic use has been the search for more soluble salicylate preparations, which result in a higher blood level. The speed of absorption and the duration of the blood level of salicylate ion, have been the prime, focal points of pharmacologic research. Means for increasing the tissue concentration of the salicylate ion have received little attention. The products of the present invention provide a new means for achieving anti-inflammatory, analgesic and antiseptic action at the tissue and cellular level, by providing a high tissue concentration after topical application, thereby circumventing the limiting factors associated with oral and parenteral administration of the conventional older salicylate compounds.

Undecylenic acid is an 11-carbon, unsaturated yellow liquid compound with a characteristic rancid odor. It is primarily a fungistatic agent, although fungicidal activity may be observed after prolonged exposure to high concentration of the compound. The drug is commonly used against a variety of fungi, including the common pathogens of the superficial mycoses. Because of the limitations of the liquid state, undecylenic acid is used in the form of the zinc salt, although combinations of the salt and the free acid are also utilized. The use of the zinc ion to convert liquid undecylenic acid into a stable solid salt, gives rise to an insoluble compound which has virtually no tissue penetration. Furthermore, the insolubility of the zinc compound in aqueous tissue fluids and exudates limits the overall antifungal activity of the undecylenate moeity.

Unexpectedly, these new and novel compounds achieve this high tissue concentration after the administration of only minimal quantities far below the dosages required when the oral route is used. When these new compounds are applied to the skin and mucous membranes, they readily traverse the lipid tissue barrier to concentrate in the submucosal and subdermal tissues. Furthermore, these new compounds exhibit high solubility in oil and non-polar solvents, but are virtually insoluble in aqueous media. This unexpected solubility characteristic is in direct contrast to the well known aqueous solubility for quaternary compounds and the characteristic of being insoluble in oils and non-polar solvents, as is known for the general class of salts. Despite the insolubility of the quaternary nitrogen undecylenate compound, it exhibits a high order of antifungal activity.

Quaternary ammonium compounds represent a class of cationic nitrogen substances, having a positive charge on the nitrogen atom. The class of cationic chemicals are used principally as wetting agents and detergents or as antiseptics, but are not known to have direct pharmacologic action other than noxious toxic effects. The quaternary compounds are generally incompatible with negatively charged substances, soaps, sulfates and alkali. When introduced into the body these agents cause a prompt hemolysis of the red blood cells and also act to destroy the lipid cell wall. The general formula commonly given to quaternary compounds is $(R_4N) \cdot X$. The nitrogen atom carries a positive charge and the R group is bound to the nitrogen atom thru a covalent linkage. Quaternary ammonium salts differ significantly from salts of primary, secondary and tertiary amines. This is demonstrated by the reaction of quaternary ammonium compounds with bases. Whereas the amine salt liberates the amine base in alkaline media, the quaternary ammonium compound, containing no ammonium hydrogen, results in an equilibrium mixture containing the quaternary base. The quaternary ammonium base rivals the fixed alkali hydroxides in extent of ionic dissociation. Quaternary bases are also capable of absorbing carbon dioxide, etching glass and acting as corrosive alkali. If the quaternary nitrogen compound contains a higher alkyl substituent, such as the lauryl or cetyl radicals, then lipid solubility is conferred to the molecule, so that the resulting compound possesses a high degree of surface activity. These surface-active quaternary compounds result in tissue irritation and cellular lysis, which prevents their use in systemic therapy. Quaternary ammonium salts are prepared by reacting a tertiary amine, either aliphatic or heterocyclic; with an alkyl inorganic acid ester, as for example, alkyl halides or alkyl sulfates. The fundamental property of the quaternary salts is their aqueous solubility and their ability to lower the surface tension of water. Of the many quaternary salts which have been prepared, few involve the salicylate ion and these are concerned primarily with the lower alkyl group, in order to utilize the full aqueous solubilizing properties of the quaternary base, to achieve better absorption of the salicylate ion and to minimize any surface active properties of the molecule.

The compounds of the present invention are quaternary nitrogen salts, which may be represented by the general formula for this class of compounds, $(R_4N) \cdot X$. However, they are to be distinguished from other members of this general class of compounds in that at least one R group is a higher aliphatic alkyl radical, which may be saturated or unsaturated, and having a carbon chain length of from 8 through 20 carbons. The remaining R groups may consist of saturated or unsaturated aliphatic alkyl groups of from one to four carbons in chain length, aromatic, cyclic and heterocyclic groups having from 3 to 6 carbon atoms, phenyl, thionyl, furfuryl and pyridyl groups; and X may be either a salicylate, acetylsalicylate, para-aminosalicylate or undecylenate ion.

The quaternary nitrogen compounds of the present invention also include those cyclic quaternary nitrogen derivatives, such as the alkyl pyridinium and the alkyl piperidinium derivatives. In these quaternary cyclic nitrogen compounds, nitrogen atom is a part of the ring and the carbon-nitrogen linkage may be either saturated or unsaturated. The general formula for the unsaturated ring compounds is represented as $(RCH=N \cdot R_1) \cdot X$, wherein the R group is from 1 through 4 methyl groups and $R_1$ is a higher alkyl saturated or unsaturated group, having from 8 through 20 carbons in chain length and X is a salicylate, acetylsalicylate, para-aminosalicylate and undecylenate ion. When either a saturated or unsaturated ring configuration is involved, the quaternary compounds are referred to according to the nomenclature of the ring, as for example, a di-alkyl piperidinium derivative or alkyl pyridinium derivative. Whereas the non-ring structures are generally referred to as a tetra-alkyl ammonium derivative.

The subject compounds may be prepared through the inter-reaction between an appropriate quaternary nitrogen salt and a basic salt of salicylic acid, acetylsalicylic acid and para-aminosalicylic acid. Quaternary ammonium salts having the following structural formula may be used for the preparation of the respective quaternary ammonium salicylate, quaternary ammonium acetylsalicylate, quaternary ammonium para-aminosalicylate and quaternary ammonium undecylenate.

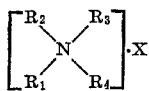

Wherein $R_1$ is a saturated or unsaturated alkyl group, having from 8 to 20 carbons in chain length; $R_2$ and $R_3$ are saturated or unsaturated alkyl groups having from 1 to 4 carbons in chain length and $R_4$ is a radical selected from the group consisting of unsaturated and saturated alkyl groups of from 1 to 4 carbons in chain length, cyclic alkyl groups having from 3 to 6 carbon atoms, phenyl, thionyl, furfuryl and pyridyl groups; and X is an ion selected from the group of ions consisting of chloride, bromide, iodide, nitrate and sulfate ions.

Quaternary pyridinium or quaternary piperidinium salicylate, acetylsalicylate, para-aminosalicylate and undecylenate compounds may be prepared by utilizing as a starting material a compound of the following saturated or unsaturated heterocyclic structures:

(Quaternary pyridinium salt)

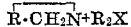

(Quaternary piperidinium salt)

wherein $R_1$ is a saturated or unsaturated alkyl group, having from 1 to 4 carbons in chain length and $R_2$ is selected from the group consisting of saturated or unsaturated alkyl groups having from 8 to 20 carbons in chain length, a cyclic or heterocyclic alkyl group having from 3 to 6 carbon atoms, thionyl, benzyl and furfuryl groups; and X is an ion selected from the group consisting of chloride, bromide, iodide, nitrate and sulfate ions.

The appropriate quaternary nitrogen compound is reacted with a basic salt of salicylic acid, acetylsalicylic acid para-aminosalicylic acid or undecylenic acid preferably in an aqueous or polar medium. Suitable solvents for this reaction are water alcohol acetone chloroform and chlorobenzene. Mixtures of alcohol-water may be utilized as the solvent as well as such solvent mixtures as acetone and benezene and chloroform and benzene. By selecting the proper solvent the kinetics of the reaction may be controlled and the formation of the desired compound may be either accelerated or inhibited. Should it be especially desired to slow the rate of reaction then a colloid may be utilized which is capable of adsorbing the polar solvent and the quaternary base. Such colloids as carboxymethylcellulose, pectin and polygalacturonic acid may be utilized in this manner, to slow the rate of reaction.

When acetylsalicylic acid and its salts are used as the acid moiety to prepare a quaternary nitrogen acetylsalicylate compound, then the pH of reaction medium must be carefully controlled, in order to prevent saponification of the ester. Aqueous solvents should be utilized with care and temperatures above 40° C. should be avoided. The preferred pH range for the preparation of the acetylsalicylate derivative is below pH 8. This may be achieved by first preparing a solution of the appropriate quaternary nitrogen salt and adding to it, in drop-wise manner, a solution of the acetylsalicylate compound. As the reaction progresses, the pH of the solution will shift to the acid side and when the reaction is complete, the pH is pH 3. The preferred solvent for formation of acetylsalicylate derivatives is a liquid alkanol of the formula ROH, wherein R is from 1 through 4 carbons in chain length.

The quaternary para-aminosalicylate derivatives and the quaternary undecylenic acid derivatives may be obtained by the same general methods of preparation, although the kinetics of the reaction for the particular quaternary compound salt will vary according to the particular starting materials used. Thus, the quaternary para-aminosalicylate compound will form at a slower rate than will other salicylate derivatives and may require a longer reaction time or the use of catalysts. The undecylenic acid compound, however, will form a quaternary salt at a faster rate because of its stronger acidity and its rate may be controlled by the use of colloids as described above. For both these acids the nature of the solvent used is important and a preferred solvent is a liquid alkanol of from 1 to 4 carbons, although alkanols of from 1 through 6 carbons in chain length may be utilized, as well as other inert solvents such as acetone, chloroform, benzene and petroleum ether. Furane and dioxane are also examples of inert solvents which may be used to carry out these reactions.

Cetyldimethylbenzylammonium salicylate is a representative compound of the quarternary salicylate salts obtained by the methods of the present invention. When cetyldimethylbenzylammonium chloride is caused to react with sodium salicylate, in the presence of ethanol as the solvent, cetyldimethylbenzylammonium salicylate is obtained as a white solid having a melting point of 41-43° C. The compound is extremely soluble in alcohol, chloroform and benzene but virtually insoluble in water (0.3%) at 25° C. The compound analyzes in good agreement with its theoretical values for carbon, hydrogen and nitrogen:

Theory: carbon 77.22%; hydrogen 10.33%; nitrogen 2.81%. Found: carbon 77.41%; hydrogen 10.05%; nitrogen 2.75%.

Cetyldimethylbenzylammonium salicylate has a molecular weight of 497.7 and contains 27.7 percent or salicylate moiety. The pH of a saturated solution of this compound is pH 3. The infrared spectrum of cetyldimethylbenzylammonium salicylate has the following characteristic peaks:

(1) At 3400 cm.$^{-1}$ the strong quaternary nitrogen absorption is noted.

(2) Characteristic carbonyl peaks of salicylic acid at 1650 cm.$^{-1}$ and at 1600 cm.$^{-1}$ have shifted to the peaks at 1625 cm.$^{-1}$ and 1575 cm.$^{-1}$ for the salicylate ion.

(3) Shift of the carbonyl peak at 895 cm.$^{-1}$ of salicylic acid to 865 cm.$^{-1}$ of the salicylate ion.

(4) Characteristic peaks for four adjacent H in salicylate at 760 cm.$^{-1}$ is present as well as the pair of peaks at 735 cm.$^{-1}$ and 705 cm.$^{-1}$ characteristic of five adjacent H found in the benzyl radical of cetyldimethylbenzylammonium.

The surface tension of cetyldimethylbenzylammonium salicylate, determined at 25° C. by the capillary rise method, is as follows:

| Aqueous concentration: | Dynes/cm.$^2$ |
|---|---|
| 0.1% | 31.50 |
| 0.05% | 35.48 |
| 0.025% | 36.47 |

When cetyldimethylbenzylammonium chloride is reacted with sodium undecylenate, cetyldimethylbenzylammonium undecylenate is obtained, with a melting point of 105–106° C. The compound has a molecular weight of 534.7 and an empiric formula of $C_{25}H_{46}O_3NCl$. The compound analyzes in good agreement with its theoretical values for carbon, hydrogen and nitrogen. The compound is soluble in water (0.1%) and very soluble in alcohol and chloroform. It is slightly soluble in benzene and ether. The infrared spectrum of cetyldimethylbenzylammonium undecylenate shows a strong quarternary nitrogen absorption peak at 3400 cm.$^{-1}$ and a pair of peaks at 735 cm.$^{-1}$ and 705 cm.$^{-1}$, characteristic of five adjacent hydrogen atoms found in the benzyl radical of the cetyldimethylbenzylammonium ion. There is a characteristic shift in the bands for the carboxyl group of the undecylenate ion.

The surface tension of cetyldimethylbenzylammonium undecylenate was determined by the capillary rise method, at 25° C. and showed the following values:

| Aqueous concentration: | Dynes/cm.$^2$ |
|---|---|
| 0.01% | 27.1 |
| 0.05% | 28.1 |
| 0.025% | 31.0 |

Cetylpyridinium salicylate is prepared by reacting cetylpyridium chloride and sodium salicylate. The compound is obtained as a white crystalline substance, having a molecular weight of 459.65 and an empiric formula of $C_{28}O_4H_{45}N$. The compound has a melting point of 53–55° C. and anlyzes in good agreement with its theoretical values:

Theory: carbon 73.13%; hydrogen 9.90%; nitrogen 3.06%. Found: carbon 72.68%; hydrogen 9.71%; nitrogen 3.17%.

The infrared spectrum of cetylpyridinium salicylate establishes this compound to be a new salt which has characteristic bands separate from that of its component moieties. The characteristic peaks at 3400 cm.$^{-1}$ establishes the quanternary nitrogen band and there is also a shift in the characteristic carbonyl peaks of the salicylic acid group to indicate salt formation. The compound is very soluble in ethanol and chloroform; sparingly soluble in benzene and ether and virtually insoluble in water (0.15%). The pH of a saturated aqueous solution is pH 5. The surface tension was determined by the capillary rise method at 25° C. and the following values were found:

| Aqueous concentration: | Dynes/cm.$^2$ |
|---|---|
| 0.1% | 32.33 |
| 0.05% | 34.85 |

The new compounds exhibit a good order of antiseptic activity when tested against *Staphylococcus aureus*. When tested by the conventional Draize eye test and by the conventional tissue irritation test, the compounds exhibit a notable lack of irritation when compared with conventional quaternary ammonium compounds. The compounds are safe for use on both epidermal and mucosal surfaces.

The new compounds are essentially non-toxic and exhibit a good penetrating power across the epidermal and mucosal tissues to achieve a high tissue concentration without a high blood level. In this manner the local tissue concentration of the active compound may be rapidly elevated, without the systemic administration of high dosage levels. This unexpected response is achieved because of the unique oil and water partition distribution of the respective moieties in contrast to that of the conventional quaternary ammonium salts. This property greatly facilitates the therapeutic usage of these compounds since it permits a target therapeutic concentration without subjecting the organism to a systemic effect.

The new compounds may also be administered by the oral and rectal routes as well as the transepidermal and transmucosal routes. Should it be desired to achieve a blood level without oral administration, the sublingual tablet route may be utilized, as well as suppositories. Ointments, creams, lotions, and powders are preferred methods for achieving a local elevated tissue concentration. For oral administration the conventional tablets, granules, powders and liquid preparations may be used.

The pharmaceutical dosage forms to be utilized are selected to meet the specific needs of the patient. The range in concentration of the new quaternary nitrogen derivatives is from 0.01% to 5% by weight, of the compound, depending upon the particular use and the route of administration. Thus, the concentration of active ingredient may be as low as 0.1% and as high as 5% when a topical dosage form is desired, while the range of active ingredient for internal oral usage is from 0.01% to 2%, depending upon the particular use and compound selected. Should it be desired to utilize these compounds as spermaticides, then concentrations of up to 1% may be conveniently used. A shampoo will require a range of from 0.1% to 2% of the active compound. The specific active ingredient will also influence the concentration of the particular compound in the unit dosage form. Thus, the para-aminosalicylate acid quaternary nitrogen derivative will exert a local anesthetic effect in addition to its germicidal effect and this anesthetic effect will vary directly with the concentration of active ingredient. The higher the concentrtaion of the compound in the unit dose form, the greater will be the intensity of the anesthetic action. Similarly, the anti-inflammatory properties of the salicylate moiety will be in direct relationship to its concentration in the unit dose form and the analgetic properties of the salicylate ion will be directly proportional to its tissue concentration, which is dependent upon the amount of compound present in the preparation.

The following examples illustrate the scope of this invention.

EXAMPLE 1

To a solution of one mol of cetyldimethylbenzylammonium chloride, dissolved in 1 liter of isopropyl alcohol, is added 1 mol of sodium salicylate, dissolved in one liter of isopropyl alcohol. The mixture is stirred while the temperature is elevated to about 80° C. which is maintained for a 4 hour period. At the end of this time, the mixture is allowed to cool to room temperature and filtered. The solvent is concentrated under reduced pressure to ⅓ its volume and an equal volume of water is added while stirring. The mixture is then set aside to crystallize in an ice-chest. A white waxy solid is obtained which is cetyldimethylbenzylammonium salicylate, melting at 41–43° C. The compound has a molecular weight of 497.768, and an empiric formula of $C_{32}H_{51}NO_3$. The compound analyzes in good agreement with its theoretical carbon, hydrogen and nitrogen values.

Theory: carbon 77.22%; hydrogen 10.33%; nitrogen 2.81%. Found: carbon 77.41%; hydrogen 10.05%; nitrogen 2.7%.

The ultraviolet absorption spectrum for cetyldimethylbenzylammonium salicylate, obtained from a 0.002% ethyl alcohol solution, exhibits a maximum absorbance at 298 m$\mu$ and a minimum at 252 m$\mu$. The infrared spectrum of cetyldimethylbenzylammonium salicylate has characteristic peaks at 3400 cm.$^{-1}$ to indicate the strong quaternary nitrogen absorption band; there is a shift in the characteristic carbonyl peaks of salicylic acid at 1650 cm.$^{-1}$ and 1600 cm.$^{-1}$ and 1575 cm.$^{-1}$. There is also a shift of the peak at 895 cm.$^{-1}$ to 865 cm.$^{-1}$. The characteristic peaks of the hydrogen atoms on the aromatic rings is observed at 760 cm.$^{-1}$ and 705 cm.$^{-1}$.

When the surface tension of cetyldimethylbenzylammonium salicylate is determined at 25° C., utilizing the capillary rise method, the following values are obtained:

| Aqueous concentration: | Dynes/cm.$^2$ |
|---|---|
| 0.1% | 31.50 |
| 0.05% | 35.48 |
| 0.025% | 36.47 |

The compound is soluble in ethanol, chloroform and benzene and insoluble in water. The pH of a saturated solution of cetyldimethylbenzylammonium salicylate at 25° C. is pH 3.

EXAMPLE 2

In place of the cetyldimethylbenzylammonium chloride utilized in Example 1 above, there may be substituted in equi-molecular amounts in alkyl aromatic quaternary ammonium salt of the formula $(R_1, R_2, R_3, R_4)NX$ wherein $R_1$ is a saturated or unsaturated alkyl group having from 8 to 20 carbons in chain length; $R_2$ and $R_3$ are saturated or unsaturated alkyl groups having from 1 to 4 carbons in chain length; and $R_4$ is a radical selected from the group consisting of unsaturated and saturated alkyl groups of from 1 to 4 carbons in chain length; cyclic alkyl groups having from 3 to 6 carbon atoms, benzyl, thionyl, furfuryl, pyridyl and piperidyl rings; and X is an ion selected from the group of ions consisting of chloride, bromide, iodide, nitrate and sulfate ions. The remainder of the steps being the same and the respective alkyl aromatic quaternary nitrogen salicylate is obtained.

EXAMPLE 3

In place of the sodium salicylate used in Examples 1 and 2 above, there may be substituted in equimolecular amounts any metallic salt of salicylic acid, which is soluble in the solvent used. The process may be carried out with insoluble metallic salts of salicyclic acid but this requires a longer period of reaction and higher temperatures. In some instances autoclaving will be found desirable when insoluble metallic salts are being utilized. The remainder of the steps being the same and the respective quaternary nitrogen salicylate salt is obtained in good yield.

EXAMPLE 4

In place of the sodium salicylate used in Examples 1 and 2 above, there may be substituted in equimolecular quantities a metallic salt of para-aminosalicyclic acid, acetylsalicylic acid and undecylenic acid. Said metallic salt of the respective acids is preferably soluble in the solvent utilized and examples of such salts are the sodium, potassium and lithium salts of the respective acids described above. Insoluble metallic salt of para-aminosalicylic acid, acetylsalicylic acid and undecylenic acid, may also be utilized to prepare the respective new compounds but this will require a longer period of synthesis and an elevated temperature. The remainder of the steps being the same and the respective alkyl aromatic quaternary nitrogen salt of para-aminosalicylic acid, acetylsalicylic acid or undecylenic acid, is obtained in good yield.

EXAMPLE 5

To a solution of 1 mol of cetyldimethylbenzylammonium chloride, dissolved in 1 liter of ethanol, is added 1 mol of anhydrous sodium bicarbonate, in small increments. As the sodium bicarbonate is added to the solution, ebulition results, with the formation of an oily layer. The mixture is stirred until ebulition ceases and additional quantities of the bicarbonate added. When all of the sodium bicarbonate has been added and ebulition has subsided, the mixture is extracted with 2 volumes of chloroform. The chloroform extract is added to a solution of 1 mol of undecylenic acid, dissolved in 1 liter of chloroform. The mixture is stirred and warmed to about 80° C. for a period of 4 hours. The stirring is stopped and the solution allowed to return to room temperature. The chloroform is then reduced in volume to the point where crystallization just begins and the whole set aside in an ice-chest overnight. Cetyldimethylbenzylammonium undecylenate is obtained as a white, waxy material which melts at 105–106° C. and has an empiric formula of $C_{25}H_{46}O_3$ NCl, with a molecular weight of 543.7. The compound is insoluble in water (0.1%) and a saturated solution has a pH of 6.9. The compound is extremely soluble in ethyl alcohol and chloroform and slightly soluble in benzene and ether.

The infrared spectrum shows a strong quaternary nitrogen absorption band at 3400 cm.$^{-1}$, as well as the characteristic peaks at 735 cm.$^{-1}$ and 705 cm.$^{-1}$, characteristic of the five adjacent hydrogens found in the benzyl radical. When tested for surface tension by the capillary rise technique at 25° C., the following values were found:

| Aqueous concentration: | Dynes/cm.$^2$ |
|---|---|
| 0.1% | 27.1 |
| 0.05% | 28.1 |
| 0.025% | 31.0 |

EXAMPLE 6

In place of the undecylenic acid used in example 5 above, there may be substituted in equimolar quantities, salicylic acid, acetylsalicylic acid or para-aminosalicylic acid. The remainder of the steps are the same and the respective salicylic acid, acetylsalicylic acid or para-aminosalicylic acid quaternary cetyldimethylbenzylammonium salt is obtained.

EXAMPLE 7

To a solution of 1 mol of cetylpyridinium chloride, dissolved in 500 cc. of ethyl alcohol, is added 1 mol of sodium salicylate. The mixture is refluxed for 2½ hours and then allowed to sit overnight at room temperature. The solution is then filtered to remove the precipitated sodium chloride and the alcohol evaporated under reduced pressure. The residue is dissolved in chloroform and washed twice with distilled water. The chloroform layer is dried over anhydrous sodium sulfate, and is then concentrated under reduced pressure to the point of crystallization. The mixture is then set aside in an ice-chest to crystallize. Cetylpyridinium salicylate is obtained as a waxy solid, having an empiric formula of $C_{28}O_4H_{45}N$, and a molecular weight of 459.65, and melts at 53–55° C. The compound analyzes in good agreement with its theoretical values:

Theory: carbon 73.13%; hydrogen 9.90%; nitrogen 3.06%. Found: carbon 72.68%; hydrogen 9.71%; nitrogen 3.17%.

Cetylpyridinium salicylate is virtually insoluble in water (0.15%) and very soluble in ethanol and chloroform; it is slightly soluble in benzene and ether. The pH of a saturated aqueous solution is pH 5. The surface tension of cetylpyridinium salicylate obtained by the capillary rise method at 25° C. is as follows:

| Aqueous concentration: | Dynes/cm.$^2$ |
|---|---|
| 0.1% | 32.33 |
| 0.05% | 34.85 |

The compound has a characteristic infrared spectrum which shows a shift in the carbonyl bands of the salicylate moiety and a strong band for the quaternary nitrogen.

EXAMPLE 8

In place of the sodium salicylate used in Example 7 above, there may be substituted in equimolecular quantities a metallic salt of acetylsalicylic acid, para-aminosalicylic acid and undecylenic acid. Said metallic salt of the respective acids is preferably soluble in the solvent utilized for the reaction and examples of such salts are the sodium, potassium and lithium salts of the respective acids described above. Insoluble metallic salts of para-aminosalicylic acid, acetylsalicylic acid and undecylenic acid may also be used, to prepare the respective new compounds but the use of the insoluble metallic salts will require a longer period of refluxing. Apart from this, the remainder of the steps are the same and the respective cetylpyridinium para - aminosalicylate, cetylpyridinium acetylsalicylate and cetylpyridinium undecylenate quaternary salt will be obtained.

EXAMPLE 9

In place of the cetylpyridinium chloride used in Examples 7 and 8 above, there may be substituted in equimolecular concentration, cetylpiperidinium chloride and the remainder of the steps are the same. The respective cetylpiperidinium quaternary salts of salicylic acid, acetylsalicylic acid, para-aminosalicylic acid and undecylenic acid are obtained in good yield.

EXAMPLE 10

In place of the cetylpiperidinium chloride and the cetylpyridinium chloride used in Examples 7, 8 and 9 above, there may be substituted in equimolecular concentration a quaternary pyridinium or quaternary piperidinium salt of the following saturated or unsaturated heterocyclic structure:

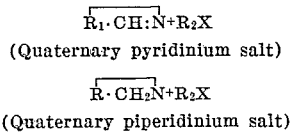

Wherein $R_1$ is a saturated or unsaturated alkyl group, having from 1 to 4 carbons in chain length and $R_2$ is selected from the group consisting of saturated or unsaturated alkyl groups having from 8 to 20 carbons in chain length, a cyclic or heterocyclic alkyl group having from 3 to 6 carbon atoms, thionyl, benzyl and furfuryl groups; and X is an ion selected from the group consisting of chloride, bromide, iodide, nitrate and sulfate ions. The remainder of the steps being the same and the respective salicylate, acetylsalicylate and para-aminosalicylate and undecylenate quaternary salt of the appropriate substituted pyridine or piperidine base will be obtained.

EXAMPLE 11

To a solution of 0.1 mol of cetylpyridinium chloride dissolved in 500 ml. of butanol, is added a 10 percent by weight solution of sodium bicarbonate, in small increments. As the solution of sodium bicarbonate is added, strong ebulition results. The mixture is stirred until the carbon dioxide evolution ceases and then an additional increment is added. When there is no further liberation of carbon dioxide after the addition of sodium bicarbonate solution, the mixture is warmed to about 80° C. while stirring, for a period of ½ hour. The solution is cooled and 500 ml. of chloroform added. The chloroform layer is separated from the aqueous layer. The aqueous layer is extracted twice with chloroform and the chloroform extracts added to the first chloroform layer. The mixed chloroform solution is dried over anhydrous sodium sulfate. To the dried chloroform solution is then added 0.1 mol of salicylic acid, dissolved in 750 ml. of chloroform and the whole heated to reflux temperature for 1 hour. At the end of this time the mixture is cooled and the chloroform evaporated to dryness. The residue is dissolved in hot isopropyl alcohol and water added to the point of crystallization. The mixture is then set aside in an icechest to crystallize and cetylpyridinium salicylate is obtained in better than 90 percent yield. The cetylpyridinium salicylate compared in every respect to that obtained as a result of Example 7 above.

EXAMPLE 12

In place of the cetylpyridinium chloride used in Example 11 above, there may be substituted in equimolecular quantities a quaternary pyridium or quaternary piperidinium salt of the following saturated or unsaturated heterocyclic structure.

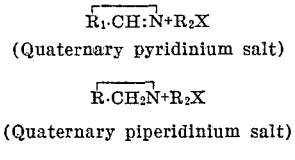

wherein $R_1$ is a saturated or unsaturated alkyl group, having from 1 to 4 carbons in chain length and $R_2$ is selected from the group consisting of saturated or unsaturated alkyl groups having from 8 to 20 carbons in chain length, a cyclic or heterocyclic alkyl group having from 3 to 6 carbon atoms, thionyl, benzyl and furfuryl groups, and X is an ion selected from the group consisting of chloride, bromide, iodide, nitrate and sulfate ions. The remainder of the steps being the same and the respective salicylate quaternary pyridinium or piperidinium salt will be obtained.

EXAMPLE 13

In place of the salicylic acid used in Examples 11 and 12 above, there may be substituted in equimolecular quantities, acetylsalicylic acid, para-aminosalicylic acid and undecylenic acid. The remainder of the steps are the same and the respective acetylsalicylic acid, para-aminosalicylic acid and undecylenic acid quaternary salt of the appropriate substituted piperidine and pyridine base will be obtained.

EXAMPLE 14

When it is desired to utilize the new quaternary nitrogen salts of salicylic acid, acetylsalicylic acid, para-aminosalicylic acid and undecylenic acid in therapy, then these new compounds may be administered either topically, orally, rectally or by the baccal or sublingual routes. When the topical application is preferred, then ointments, gels, creams, shampoos or lotions may be used. Dusting powders containing the new compounds will also be found useful in topical therapy. The range in concentration of active ingredient for topical use is from 0.1 percent to 5 percent by weight. In preparing an ointment the preferred amount of active ingredient is levigated with a pharmaceutically acceptable ointment base, as for example, U.S.P. hydrophilic absorption base, petrolatum and cold cream. Heat may be utilized in the preparation of the ointments. The finished ointment product will be found to be stable under the usual methods of storage. Oil in water, as well as water in oil emulsion bases may be utilized for the preparation of the ointment dosage forms.

For lotions, creams and shampoos, the active ingredient is added to the appropriate vehicle so that the range in unit dosage is from 0.1 percent to 5 percent of the desired active compound. Because of the unique surface tension of the respective new compounds, a uniform dispersion results, which is independent of the solubility of the particular compound in the vehicle.

Dusting powders are prepared by adding the selected active ingredient to the powder vehicle, consisting of talc, kaolin, starch or mixtures of these, as well as any other pharmaceutically acceptable inert powder vehicle. The range in concentration of the active ingredient in the powder dosage form for topical use is from 0.1 percent to 5 percent.

When it is desired to administer the new compounds by the oral route then both liquid and solid preparations may be used. The concentration of active ingredient for products intended for oral administration is from 0.1 percent to 2 percent, depending upon the particular needs of the patient. The liquid preparations which may be utilized for this purpose are solutions, syrups, tinctures and elixirs. Such solvents as water, propylene glycol, glycerin, sorbitol, ethanol and mixtures of these may be used as vehicles for liquid preparations. In preparing these liquid dosage forms the appropriate quantity of active ingredient is dissolved or suspended in the selected vehicle and pharmaceutically acceptable coloring and flavoring materials may be added, if desired. The usual unit dosage for these liquid preparations is 1 teaspoonful (5 ml.), and the range in unit dosage is from 0.01 percent to 2 percent by weight, administered from 1 to 6 times daily.

Tablets, capsules, granules and powders are preferred solid forms for oral administration. The range in unit dosage for these solid dosage forms is from 0.1 percent to 2 percent by weight of the active ingredient. In preparing a tablet the appropriate quantity of active ingredient is mixed with a diluent in the amount of from 1 to 10 times the weight of active ingredient. Pharmaceutically acceptable diluents such as starch, lactose, sucrose and mannitol may be used for this purpose. A binding agent such as polygalacturonic acid, gum acacia or gum tragacanth, is added in quantities of up to 1 percent of the mix and a tablet lubricant, such as magnesium stearate, is added, in concentration of from 0.1 percent to 1 percent. The mixture is then moistened with water or ethanol-water mixtures and granulated. The moist granulation is then air-dried and the tablets compressed into suitable size and shape, so that each unit dose contains from 0.01 percent to 2 percent of the active ingredient.

In preparing capsules, the tablet mix, consisting of the active ingredient and diluent, may be filled directly into the gelatin capsule of suitable size and shape. There is no need to add a binder or a lubricating agent, unless specifically required by the particular filling machines used.

In the preparation of granules, the tablet mix is granulated through a No. 8 standard mesh screen, although granules may be prepared using other convenient standard mesh screens, ranging in size from a No. 5 to a No. 20 standard mesh.

Powders for oral administration are prepared by grinding the tablet mix to a particle size smaller than a No. 60 standard mesh and then subdividing these into unit packets so that each packet will contain a dosage concentration of active ingredient of from 0.01 percent to 2 percent by weight.

Should it be desired to administer the new compounds by the buccal or sublingual routes, then appropirately shaped tablets for this purpose are used, and may be prepared by the above described tableting procedure with the exception that the diluent should preferably be a soluble one. The use of a polymeric gum such as polygalacturonic acid or a sugar alcohol such as sorbitol or mannitol as a carrier for the tablets, is preferred when buccal or sublingual tablets are desired, although good absorption across mucosal membarne will be achieved when the conventional tablet formulation is used for this purpose.

Suppositories containing the active ingredient are the preferred form for rectal administration. The new compounds are dispersed in a pharmaceutically acceptable suppository base, as for example, the polyoxyethylene glycol compounds, which are known in the trade as "Carbowaxes" and have an average molecular weight of from 1000 to 6000; cocoa butter, cetyl alcohol, spermaceti, or mixtures of these. The dosage range of the active ingredient for the suppository dosage form is from 0.1 percent to 2 percent by weight. In preparing suppositories the active ingredient is mixed with the appropriate quantity of the pharmaceutically acceptable suppository base and the mixture is then subdivided into suppositories of suitable size and shape. Either the cold dispersion technique, followed by pressure extrusion, or the hot-pour molding procedure may be utilized in the preparation of suppositories.

EXAMPLE 15

When it is desired to utilize the new compounds as a spermicidal agent, then a water-miscible topical base, such as gels of karaya gum, gum tragacanth or polyoxyethylene glycol having an average molecular weight of from 1000 to 4000, or mixtures of these, may be used. The concentration of active compound in the unit dosage of a spermicidal preparation is from 0.01 percent to 2 percent of the active compound. The selected active compound is dispersed in the base, preferably while the base is molten. The product is stable and non-irritating to mucous membranes. Soluble tablets and vaginal suppositories may also be used and the concentration of active ingredient will be the same for the soluble tablets and vaginal suppositories, to wit, from 0.01 percent to 2 percent of the active ingredient per unit dose.

EXAMPLE 16

When it is desired to utilize the new compounds in the treatment of topical dermatoses, then ointments, creams, lotions, shampoos and powders, as described in example 14, may be used. The preparation is applied directly to the affected area from 1 to 8 times daily, according to the needs of the patient. Absorption across the epidermal surface is rapid and a high tissue concentration is obtained on minimal dosage concentration.

What is claimed is:

1. A compound of the formula $(R_1.R_2.R_3.R_4)NX$, wherein $R_1$ is a radical selected from the group consisting of linear alkyl groups having from 14 to 18 carbon atoms in length; $R_2$ and $R_3$ are alkyl radicals having from 2 to 4 carbon atoms in length and $R_4$ is benzyl and X is an ion selected from the group consisting of salicylate, acetylsalicylate, para-aminosalicylate and undecylenate ions.

2. A compound of the structure

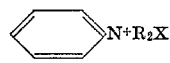

wherein $R_2$ is a radical selected from the group consisting of linear alkyl groups having from 14 through 18 carbons in chain length and benzyl and X is an ion selected from the group consisting of silicylate, acetylsalicylate, para-aminosalicylate and undecylenate ions.

3. A compound as described in claim 2, wherein $R_1$ consists of an N-butyl group and $R_2$ is a cetyl group and X is an ion selected from the group consisting of salicylate, acetylsalicylate, para-aminosalicylate and undecylenate ions.

4. A compound of claim 2, said compound being cetylpyridinium salicylate.

5. A compound of claim 2, said compound being cetylpryidinum acetylsalicylate.

6. A compound of claim 2, said compound being cetylpyridinium para-aminosalicylate.

7. A compound of claim 2, said compound being cetylpyridinium undecylenate.

8. A compound as described in claim 2, wherein R is an n-butyl radical and $R_2$ is a cetyl group and X is an ion selected from the group consisting of salicylate, acetylsalicylate, para-aminosalicylate and undecylenate ions.

References Cited

UNITED STATES PATENTS 2,692,285 10/1954 Robinson _____ 260—501.15
3,069,321 12/1962 Broh-Kahn et al. __ 260—501.15

OTHER REFERENCES

Royals: Advanced Organic Chemistry, Prentice-Hall (1054), pp. 604–5.

HENRY R. JILES, Primary Examiner

ALAN L. ROTMAN, Assistant Examiner

U.S. Cl. X.R.

260—1, 294, 332.2, 332.5, 347.3, 347.7, 404; 424—2, 263, 266, 267, 275, 285, 316